United States Patent
Marcondes et al.

(10) Patent No.: US 8,102,852 B2
(45) Date of Patent: Jan. 24, 2012

(54) METHOD AND SYSTEM FOR TIME-STAMPING DATA PACKETS FROM A NETWORK

(75) Inventors: Cesar A. C. Marcondes, Los Angeles, CA (US); Anders D. Persson, San Mateo, CA (US); Darrin P. Johnson, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 639 days.

(21) Appl. No.: 11/639,085

(22) Filed: Dec. 14, 2006

(65) Prior Publication Data

US 2008/0144624 A1   Jun. 19, 2008

(51) Int. Cl.
*H04L 12/56* (2006.01)
(52) U.S. Cl. ......... 370/392; 370/253; 370/229; 370/235
(58) Field of Classification Search .................. 370/229, 370/230, 235; 709/226, 224, 235, 232
See application file for complete search history.

(56) References Cited

U.S. PATENT DOCUMENTS

| 6,721,872 B1* | 4/2004 | Dunlop et al. .................. 712/28 |
| 2003/0002481 A1* | 1/2003 | Laursen et al. ............... 370/352 |
| 2005/0033838 A1* | 2/2005 | Nisani et al. .................. 709/224 |
| 2006/0104279 A1* | 5/2006 | Fellman et al. ............... 370/392 |
| 2007/0248013 A1* | 10/2007 | Sridharan et al. ............ 370/235 |

* cited by examiner

*Primary Examiner* — Dang Ton
*Assistant Examiner* — Pamit Kaur
(74) *Attorney, Agent, or Firm* — Osha • Liang LLP

(57) ABSTRACT

A method for timestamping data packets from a network involves receiving a first data packet from the network, obtaining, from a clock, a timestamp indicating an arrival time of the first data packet, where a network interface controller (NIC) includes the clock, providing the timestamp and the first data packet to a client operatively connected to the NIC, computing a network property using the timestamp, selecting a network protocol based on the network property, and transmitting a second data packet via the NIC using the network protocol.

15 Claims, 3 Drawing Sheets

METHOD AND SYSTEM FOR TIME-STAMPING DATA PACKETS FROM A NETWORK

CROSS-REFERENCE TO RELATED APPLICATIONS

Subject matter contained herein may be related to subject matter contained in copending U.S. patent application Ser. Nos. 11/639,042 entitled: "Method and System for Using Bayesian Network Inference for Selection of Transport Protocol Algorithm"; "Method and System for Bi-level Congestion Control for Multipath Transport" 11/638,904; "Method and System for Network Stack Tuning" 11/638,858; "Method and System for Profiling and Learning Application Networking Behavior" 11/638/891 and "Method and System for Bandwidth Allocation Using Router Feedback" 11/639,090, respectively, and filed on Dec. 14, 2006, in the names of the same inventors and having the same assignee as the present application, the entire contents of which are hereby incorporated in their entirety.

BACKGROUND

A network interface controller (NIC) is a hardware device that provides network access to a computer system. Specifically, the NIC includes a network interface for receiving data packets from a network. The NIC further includes logic for processing data packets and transferring data packets into system memory for use by clients in the computer system. The specific method by which data packets are transferred generally depends on the NIC hardware, the computer system's underlying architecture, which operating system is running on the computer system, and/or other similar factors.

For example, the computer system may determine whether data packets are available for transfer to the computer system by periodically polling the NIC to determine the NIC's status (e.g., ready, waiting, error, etc.). If polling indicates that the NIC has received a data packet, then the data packet is transferred from the NIC into system memory. Alternatively, the NIC may issue an interrupt to the computer system when a data packet is received. Specifically, the interrupt may instruct the computer system to begin transferring the data packet into system memory. As network bandwidth usage increases, interrupts occur more frequently and may divert processing cycles from execution of other tasks.

Further, the computer system may use a method known as programmed input/output (PIO), whereby the computer system processor is responsible for executing instructions to transfer data packets into system memory. In such cases, transferring data packets may divert processing cycles from execution of other tasks. To avoid processing overhead required by PIO, the computer system may instead use direct memory access (DMA), whereby the NIC writes data packets directly into system memory, with little or no computer system processing required. Processing overhead may further be reduced by grouping data packets. That is, data packets may be transferred from the NIC in groups rather than individually.

Regardless of the specific method used to transfer data packets, the computer system may use a system clock to assign timestamps to data packets. Specifically, the timestamp assigned to each data packet corresponds to a time when the system clock is accessed. If data packets are grouped, especially if polling is used, the computer system does not have any way of determining the arrival times of individual data packets in the group. Accordingly, the same timestamp is generally assigned to all data packets in the group.

Even if timestamps are associated with individual data packets, a delay exists between the data packet's arrival and the time when the timestamp is obtained from the system clock. The delay may vary significantly depending on conditions in the computer system (e.g., processing load, interrupt priorities, bus load/contention, etc.). Thus, the accuracy of the timestamps, and of dispersions between the timestamps, may also vary significantly. Further, assigning timestamps may divert processing cycles from execution of other tasks, especially if estimation of timestamp dispersions is required.

SUMMARY

In general, in one aspect, the invention relates to a method for timestamping data packets from a network. The method comprises receiving a first data packet from the network, obtaining, from a clock, a timestamp indicating an arrival time of the first data packet, wherein a network interface controller (NIC) comprises the clock, providing the timestamp and the first data packet to a client operatively connected to the NIC, computing a network property using the timestamp, selecting a network protocol based on the network property, and transmitting a second data packet via the NIC using the network protocol.

In general, in one aspect, the invention relates to a network interface controller (NIC). The NIC comprises a network interface configured to receive a data packet from a network, a clock configured to generate a timestamp indicating an arrival time of the data packet, and a processor configured to obtain the timestamp from the clock, and provide the timestamp and the data packet to a client operatively connected to the NIC.

In general, in one aspect, the invention relates to a method for installing firmware on a network interface card (NIC). The method comprises accessing a computer readable medium to obtain the firmware, and storing the firmware on the NIC, wherein the firmware comprises executable instructions for timestamping data packets from a network by receiving a first data packet from the network, obtaining, from a clock, a timestamp indicating an arrival time of the first data packet, wherein the NIC comprises the clock, and providing the timestamp and the first data packet to a client operatively connected to the NIC.

Other aspects of the invention will be apparent from the following description and the appended claims.

DETAILED DESCRIPTION

Figure 1:
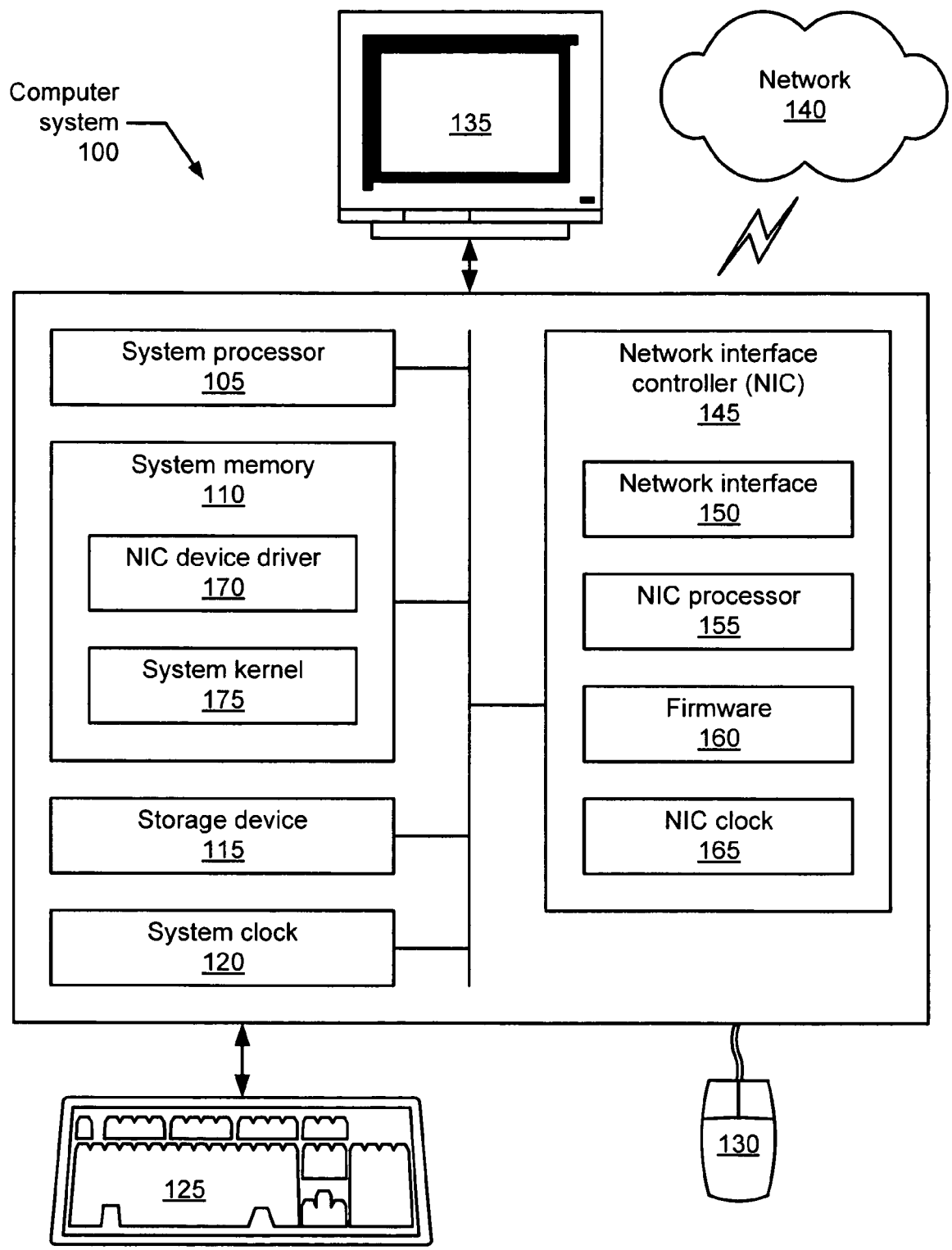
FIG. 1 shows a diagram of a computer system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for timestamping data packets from a network. A data packet is received from a network by a NIC. The NIC includes a clock, and uses the clock to obtain a timestamp indicating an arrival time of the data packet. The timestamp and the data packet are then provided to a client operatively connected to the NIC.

Embodiments of the invention may be implemented on virtually any type of computer regardless of the platform being used. For example, FIG. 1 shows a diagram of a computer system (100) in accordance with one or more embodiments of the invention. The computer system (100) includes a system processor (105), associated system memory (110), a storage device (115), a system clock (120), and numerous other elements and functionalities typical of today's computers (not shown). The computer system (100) may also include input means, such as a keyboard (125) and a mouse (130), and output means, such as a monitor (135). Those skilled in the art will appreciate that these input and output means may take other forms. Further, the computer system (100) may be a mobile device, such as a cellular telephone, personal digital assistant (PDA), portable multimedia device, etc.

Further, the computer system (100) includes a NIC (145) providing a connection to a network (140). The network (140) may be a local area network (LAN), a wide area network (WAN) such as the Internet, any other similar type of network, or any combination thereof. More specifically, the NIC (145) includes a network interface (150) configured to send and receive data packets to and from devices in the network (140). The NIC (145) may be a wireless NIC, a wired NIC such as an Ethernet controller, or any other type of NIC. Those skilled in the art will appreciate that the computer system (100) may include multiple NICs (not shown), which may be operated independently and/or cooperatively.

In one or more embodiments, the NIC (145) further includes a NIC processor (155), firmware (160) configured to store executable instructions for use by the NIC processor (155), and a NIC clock (165) configured to generate timestamps indicating arrival times of data packets. A timestamp may take many different forms. For example, the timestamp may include a Julian date, a time interval (e.g., nanoseconds, microseconds, milliseconds, seconds, etc.) since an earlier data packet was received, any other similar type of time measurement, or any combination thereof. As another example, the NIC clock (165) may include a counter, where the frequency of the counter is known and the timestamp is inferred from the known frequency and the current state of the counter. The counter's frequency may also be variable, for example if the NIC (145) includes power management functionality. Timestamps are discussed in detail below.

In one or more embodiments, the NIC processor (155) is configured to process data packets according to executable instructions stored in the firmware (160). Specifically, the firmware (160) may include executable instructions for causing the NIC processor (145) to obtain a timestamp from the NIC clock (165) indicating an arrival time of a data packet, and transfer both the data packet and the timestamp into system memory (110). If the system processor (105) is responsible for transferring data packets from the NIC (145), then the firmware may not include executable instructions for transferring data packets. Further, the firmware (160) may include executable instructions for causing the NIC processor (145) to modify the timestamp and/or data packet, e.g., by modifying a packet header, converting the timestamp to a standard time format, storing the data packet and timestamp in separate data structures, etc.

The firmware (160) may be embedded in electrically erasable programmable read-only memory (EEPROM), flash memory, a micro-drive, any other similar type of storage in the NIC (145), or any combination thereof. To install firmware (e.g., 160) on a NIC (e.g., 145), the firmware is typically first stored on a computer readable medium such as a compact disc (CD), a diskette, a flash drive, a tape, a file, or any other computer readable storage device. The computer readable medium is accessed to obtain the firmware, and the firmware is then stored on the NIC. In one or more embodiments, firmware is installed on the NIC (145) to allow the NIC (145) to perform an embodiment of the method described in FIG. 3.

In one or more embodiments, the NIC (145) receives instructions from a NIC device driver (170) loaded into system memory (110). Specifically, the NIC device driver (170) provides a layer of abstraction between a system kernel (175) and the NIC (145). The system kernel (175) provides a standard interface for software applications to use the NIC (145). In a typical scenario, a software application issues an instruction to the system kernel (175) via a network application programming interface (API) call. The system kernel (175) forwards the network API call to the NIC device driver (170), and the NIC device driver (170) translates the network API call into instructions compatible with control logic stored in the NIC (145). Alternatively, the system kernel (175) may be configured to issue instructions directly to the NIC (145) without any intervening device driver.

Those skilled in the art will appreciate that one or more elements of the aforementioned computer system (100) may be located at a remote location and connected to the other elements over a network. Further, the computer system (100) may be located in a distributed system having multiple nodes, where each portion of the computer system (100) (e.g., system processor (105), system memory (110), storage device (115), input and/or output means, etc.) may be located on a different node within the distributed system. In one or more embodiments, the node corresponds to a computer system. Alternatively, the node may correspond to a processor with associated physical memory. The node may alternatively correspond to a processor with shared memory and/or resources.

Figure 2A:
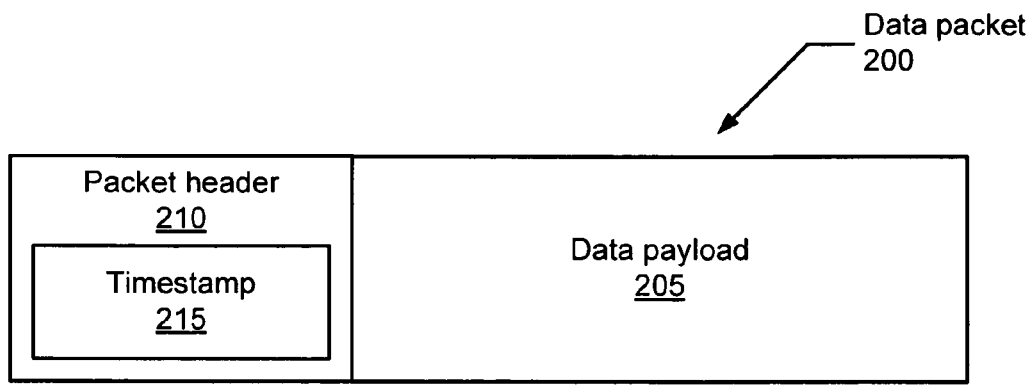
FIGS. 2A-2B show diagrams of timestamps and data packets in accordance with one or more embodiments of the invention.
Figure 2B:
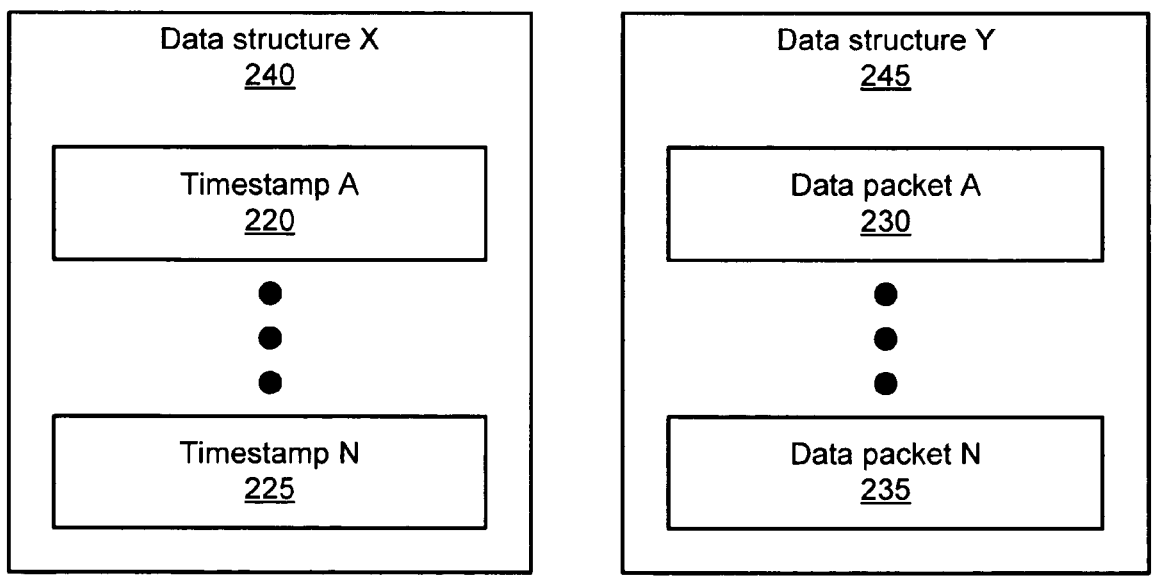

As discussed above, the NIC processor (155) is configured to obtain a timestamp from a NIC clock (165) indicating an arrival time of a data packet. The NIC processor (155) may further be configured to modify the timestamp and/or data packet. FIGS. 2A-2B show diagrams of timestamps and data packets in accordance with one or more embodiments of the invention.

As shown in FIG. 2A, a data packet (200) may include a data payload (205) and a packet header (210) storing information about the data packet (200). Specifically, the packet header (210) may include a source Internet Protocol (IP) address, a destination IP address, routing information (e.g., a number of network hops), a size of the data payload (200), network protocol information, a checksum, any other similar type of packet information, or any combination thereof.

Further, the NIC processor may place a timestamp (215) indicating an arrival time of the data packet (200) in the packet header (210). In one or more embodiments, placing the timestamp (215) in the packet header (210) allows the data packet (200) to be transferred into system memory in exactly the same manner as a non-timestamped data packet. Upon accessing the data packet (200) in system memory, a client may then process the packet header (210) to obtain the timestamp (215). Any client not using the timestamp (215) may simply ignore the additional header information.

Alternatively, the NIC processor may transfer timestamps and data packets into system memory separately, i.e., in separate data structures. For example, as shown in FIG. 2B, one or more timestamps (e.g., timestamp A (220), timestamp N (225)) are stored in data structure X (240), and one or more data packets (e.g., data packet A (230), data packet N (235)) are stored in data structure Y (245). Data structure X (240) and data structure Y (245) may be the same type of data structure, or may be different types of data structures. For example, data structure X (240) and/or data structure Y (245) may be lists (e.g., implemented as arrays, vectors, etc.), hash tables, any other similar type of data structure, or any combination thereof.

More specifically, each timestamp in data structure X (240) may correspond to a data packet in data structure Y (245). For example, the first timestamp in data structure X (240) may indicate an arrival time of the first data packet in data structure Y (245), the second timestamp in data structure X (240) may indicate an arrival time of the second data packet in data structure Y (245), etc.

In one or more embodiments, separating timestamps and data packets into separate data structures allows data packets to be transferred into system memory prior to the corresponding timestamps, or vice versa. For example, data packets may have higher transfer priority in real-time network applications, bandwidth-sensitive applications, etc. Timestamps may then be transferred into system memory during idle time. Further, placing timestamps in a separate data structure may allow the timestamps to be transferred to a digital signal processing (DSP) co-processor in the NIC, where the DSP co-processor is configured to calculate timestamp dispersions in the frequency domain using Fourier transforms.

Figure 3:
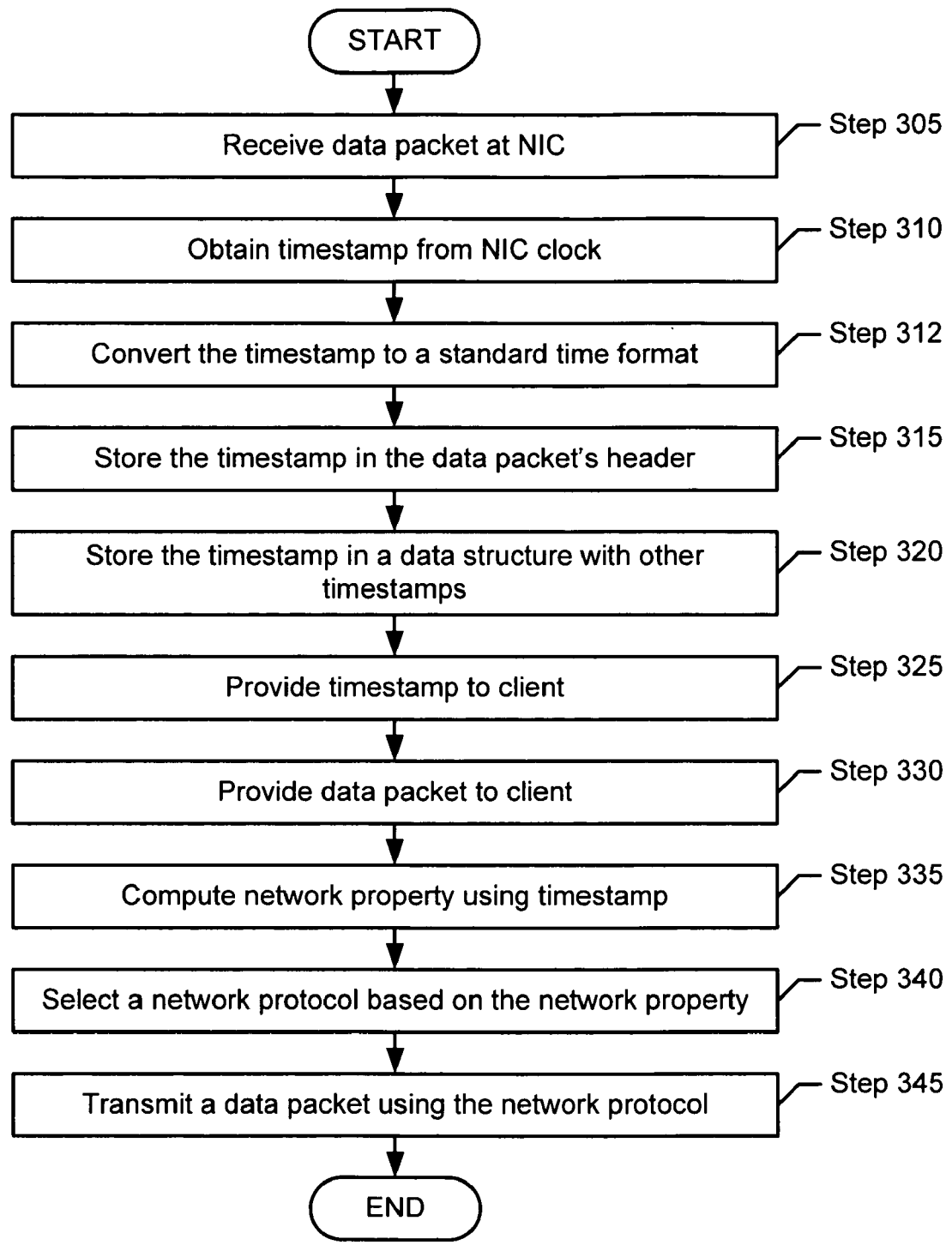
FIG. 3 shows a flowchart of a method for timestamping data packets from a network in accordance with one or more embodiments of the invention.

FIG. 3 shows a flowchart of a method for timestamping data packets from a network in accordance with one or more embodiments of the invention. In one or more embodiments, one or more of the steps shown in FIG. 3 may be omitted, repeated, and/or performed in a different order. Further, multiple steps may be performed concurrently. Accordingly, the specific arrangement of steps shown in FIG. 3 should not be construed as limiting the scope of the invention.

In Step 305, a NIC receives a data packet from a device in a network. The device may be located anywhere in the network. Further, the data packet may be associated with any type of network application, such as voice over Internet Protocol (VoIP), streaming audio and/or video, telephony, peer-to-peer networking, a file transfer, a web-based software application, or any other similar type of network application.

As discussed above regarding FIG. 1, the NIC includes a NIC clock. In Step 310, the NIC obtains a timestamp from the NIC clock. Specifically, the timestamp indicates an arrival time of the data packet received in Step 305. As discussed above, the timestamp may take many different forms, such as a Julian date, a time interval since an earlier data packet was received, a timestamp inferred from a counter, etc. Tables 1-2 show examples of timestamps in accordance with one or more embodiments of the invention. Specifically, Table 1 shows an example of a Julian date timestamp, and Table 2 shows an example of an interval timestamp.

TABLE 1

Julian date timestamp 54048.864838

TABLE 2

Interval timestamp 0.32 μs

Those skilled in the art will appreciate that timestamps may be represented in decimal notation, binary notation, hexadecimal notation, alphanumeric notation, any other similar notation, or any combination thereof. In one or more embodiments, timestamps are represented as Integers.

In one or more embodiments, obtaining a timestamp from the NIC clock ensures that individual data packets are assigned individual timestamps. Further, offloading timestamping to the NIC may eliminate inaccuracies caused by transfer delays when a system clock is used for timestamping. Therefore, the timestamps associated with each data packet are more accurate than if the data packets were timestamped using the system clock, either individually or as a group.

Specifically, timestamping individual data packets provides finer granularity than timestamping groups of data packets. For example, granularity between data packets may be measured in microseconds, while granularity between groups of data packets may be measured in milliseconds. Accordingly, more accurate timestamps may allow for computation of more accurate network properties. Computation of network properties is discussed in detail below.

Further, obtaining a timestamp from the NIC clock may improve performance of tasks executing in the computer system. Specifically, by offloading timestamping from the system processor and system clock to the NIC processor and NIC clock, more system processing cycles are available for execution of other tasks. For example, in cases where the NIC's clock has a variable-frequency counter, offloading timestamping frees system processing cycles that would otherwise be required to estimate timestamp dispersions.

Continuing with discussion of FIG. 3, in Step 312, the timestamp may be converted to a standard time format. Specifically, the timestamp as obtained from the NIC clock may be in a different format than required by a client in the computer system. Accordingly, the NIC processor may convert the timestamp to a format compatible with the client. For example, a Julian date timestamp may be converted to an alphanumeric date/time format (e.g., "Nov. 9, 2005 13:00:25.372"). As another example, if the NIC clock includes a counter, the known frequency and current state of the counter may be used to obtain a timestamp in a standard time format. Alternatively, the timestamp may be converted by a client after obtaining the timestamp from system memory. Different types of clients are discussed below.

Further, as discussed above, the NIC processor may store the timestamp in a data structure. Specifically, in Step 315, the NIC processor may store the timestamp in the data packet's header, and/or in Step 320, the NIC processor may store the timestamp in a separate data structure (e.g., a list, a hash table, etc.) with other timestamps. The NIC processor may also store the data packet in a separate data structure with other data packets.

In Steps 325 and 330, the NIC provides the timestamp and the data packet to a client in the computer system. Specifically, the NIC transfers the timestamp and the data packet into system memory for access by the client. As discussed above, the timestamp and the data packet may be transferred into system memory in a single data structure or in separate data structures. That is, Steps 325 and 330 may be performed simultaneously or separately.

For purposes of this discussion, a client refers to any software process configured to obtain the timestamp and the data packet from system memory after the transfer is complete. In one or more embodiments, the client may be a NIC device driver. Alternatively, the client may be a system kernel or a process executing therein. Those skilled in the art will appreciate that many different types of software processes may be configured to obtain timestamps and data packets from system memory.

In one or more embodiments, in Step 335, a network property is computed using the timestamp. The network property may be computed by the NIC processor (i.e., prior to transferring the timestamp into system memory), by the client, or by any other process executing in the computer system. Further, the network property may be computed using only a single data packet, using multiple data packets, and/or using other sources of information, such as a current status of the NIC (e.g., ready, waiting, error, etc.), the type of NIC used, a routing table, a hosts file, etc. For example, the network property may include a packet arrival rate (e.g., a number of megabits per second), a burst length, a peak bandwidth capacity, available bandwidth, network link speed, a round trip time (RTT), a packet send/receive delay, point-to-point network path capacity, a data loss rate, any other similar type of network property, or any combination thereof.

In one or more embodiments, the network property is computed based on data packet dispersions, i.e., differences in timestamps between consecutive data packets. Computing network properties based on dispersions is known in the art, although timestamp granularity is traditionally limited to groups of data packets, for reasons discussed above. The following is one example of computing point-to-point network path capacity based on individual data packet dispersions, and should not be construed as limiting the scope of the invention.

Suppose data packets P1, P2, and P3 arrive at the NIC sequentially, each data packet having 100 bytes (i.e., 800 bits) and belonging to the same data flow. The data packets receive timestamps (in microseconds) T1=4, T2=9, and T3=13, respectively. Thus, the dispersions between the data packets can be computed as T2-T1=5 and T3-T2=4, giving a mean dispersion of 4.5 microseconds. Because the data packets belong to the same data flow, the point-to-point network path capacity can be computed as 800 bits/$4.5 \times 10^{-6}$ seconds=177 Mbps, approximately.

Continuing with discussion of FIG. 3, in one or more embodiments, in Step 340, a network protocol is then selected based on the network property. Specifically, the network property may be used to determine an optimal network protocol for the network application associated with the data packet. The network protocol selected may be transmission control protocol (TCP) Tahoe, TCP Reno, TCP Vegas, TCP NewReno, TCP Hybla, TCP Westwood, TCP Selective Acknowledgement Options (SACK), Hamilton TCP (HTCP), High-Speed TCP (HSTCP), Binary Increase Congestion (BIC) TCP, Cubic BIC (CUBIC) TCP, Fast Active Queue Management Scalable TCP (FAST), Scalable TCP (STCP), Smart Acknowledgement (ACK) Dropper (SAD), User Datagram Protocol (UDP), or any other similar TCP or non-TCP network protocol.

In one or more embodiments, the NIC includes functionality (e.g., executable instructions in firmware) to use the timestamp obtained in Step 310 to select the network protocol. Alternatively, the network protocol may be selected by a NIC device driver, a system kernel, or any other similar process. For example, network properties may be forwarded to a network profiling service, and the network profiling service may then select the network protocol. Examples of network profiling services can be found in copending U.S. patent application Ser. Nos. 11/639,042, entitled "Method and System for Using Bayesian Network Inference for Selection of Transport Protocol Algorithm" and "Method and System for Bi-level Congestion Control for Multipath Transport" 11/638,904; and filed on Dec. 14, 2006, in the names of the same inventors and having the same assignee as the present application, the entire contents of which are incorporated above in their entirety.

In one or more embodiments, a single network property is used to select the network protocol. For example, Table 3 shows an example of how RTT, point-to-point network path capacity, data loss rate, and/or available bandwidth might be used individually to select a network protocol. Those skilled in the art will appreciate that Table 3 is provided for exemplary purposes only and should not be construed as limiting the scope of the invention.

TABLE 3

Single-property protocol selection

| | | |
|---|---|---|
| RTT > 300 ms | → | TCP Hybla |
| Path capacity > 100 mbps | → | CUBIC TCP or HTCP |
| Data loss rate > 0.1% | → | TCP Westwood |
| Available bandwidth > 75% | → | FAST |

Alternatively, multiple network properties may be used to select the network protocol. For example, Table 4 shows an example in which the network protocol selected might change as network properties for a receiving LAN (i.e., a LAN where the receiving NIC is located) change. For the purposes of this example, network properties for the source of the data packet and any intermediary network components are assumed to be constant.

Specifically, in Table 4, a network link speed, packet send/receive delay, and data loss rate (i.e., a rate at which data packets are lost in transit to the receiving LAN) are available for the receiving LAN. Combinations of these network properties are used to select a network protocol. Those skilled in the art will appreciate that Table 4 is provided for exemplary purposes only and should not be construed as limiting the scope of the invention.

TABLE 4

Multiple-property protocol selection

| Link | Loss | Delay | | Network Protocol |
|---|---|---|---|---|
| 16 kbps | 0.01% | 10 ms | → | TCP Reno |
| 32 kbps | 0.02% | 20 ms | → | TCP Westwood |
| 64 kbps | 0.04% | 40 ms | → | HSTCP |
| 128 kbps | 0.08% | 60 ms | → | TCP Reno |
| 1 mbps | 0.10% | 100 ms | → | CUBIC |
| 10 mbps | 0.20% | 10 ms | → | TCP Westwood |

In one or more embodiments, selecting a network protocol may involve referencing a lookup table, generating a Bayesian network, any other similar type of analysis, or any combination thereof. For example, the network protocol may be based on a comparison of obtained network properties against a set of simulated network scenarios. Further discussion of analyzing network properties can be found, for example, in copending U.S. patent application Ser. Nos. 11/639,042, entitled "Method and System for Using Bayesian Network Inference for Selection of Transport Protocol Algorithm"; "Method and System for Bi-level Congestion Control for Multipath Transport" 11/638,904; "Method and System for Network Stack Tuning" 11/638,858; "Method and System for Profiling and Learning Application Networking Behavior" 11/638,891 and "Method and System for Bandwidth Allocation Using Router Feedback" 11/639,090 and filed on Dec. 14, 2006, in the names of the same inventors and having the same assignee as the present application, the entire contents of which are incorporated above in their entirety.

In one or more embodiments, selecting a network protocol in Step 340 is facilitated by accurate timestamping of individual data packets. Specifically, as discussed above, obtaining timestamps from a NIC clock may improve the accuracy of network properties on which the selection is based.

Having selected a network protocol in Step 340, the selected network protocol may then be used in Step 345 to transmit a data packet to a device in the network, via the NIC.

In one or more embodiments, the transmitted data packet is associated with the same connection as the data packet obtained in Step 305. That is, the network protocol used for the connection may effectively be changed on-the-fly. In one or more embodiments, the determination about whether to change the network protocol on-the-fly depends on the type and/or duration of the connection. For example, changing the network protocol on-the-fly may be helpful during large file transfers, or in other cases where a potential performance gain outweighs the overhead of changing network protocols.

Alternatively, the transmitted data packet may be associated with a different connection than the data packet obtained in Step 305. Specifically, in one or more embodiments, the selected network protocol is used in a subsequent connection with the same device that sent the data packet received in Step 305. In one or more embodiments, selecting a network protocol on a per-device basis allows for data transmissions to be optimized according to the specific network paths to each device. The transmitted data packet may alternatively be associated with a connection to a different device altogether.

In one or more embodiments, changing network protocols using one or more embodiments described above improves performance of the network application with which the transmitted data packet is associated. Specifically, by using the selected network protocol, the network application may achieve faster transmission, a more constant transmission rate, lower latency, higher bandwidth availability, any other similar type of performance benefit, or any combination thereof. For example, if the network application requires real-time performance, the network protocol selected may help to ensure that data packets are transmitted at an approximately constant rate. As another example, a file transfer may be accelerated by selecting a network protocol that allows larger data payloads to be sent. Those skilled in the art will appreciate that many different types of performance benefits may be gained by selecting an appropriate network protocol.

Further, changing network protocols using one or more embodiments described above may improve performance of a network application not specifically associated with the transmitted data packet. For example, if the network protocol reduces network bandwidth used by the network application with which the transmitted data packet is associated, another network application may be able to use the freed bandwidth.

In one or more embodiments, one or more of the aforementioned performance improvements is enhanced by the increased granularity provided by offloading data packet timestamping to a NIC clock and a NIC processor.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for timestamping data packets from a network comprising:
   receiving, by a network interface card (NIC), an incoming data packet from the network using a first network protocol, wherein the NIC comprises a NIC clock and a NIC processor, and wherein the incoming data packet comprises a header;
   obtaining, by the NIC processor from the NIC clock, a timestamp indicating an arrival time of the incoming data packet;
   storing, by the NIC processor, the timestamp in the header of the incoming data packet to obtain an updated incoming data packet;
   transferring the updated incoming data packet directly to a memory accessible by a client operatively connected to the NIC;
   computing, by the client, a network property using the timestamp from the updated incoming data packet;
   selecting, by the client, a second network protocol based on the network property, wherein the second network protocol is selected from a plurality of network protocols and wherein the plurality of network protocols comprises the first network protocol and the second network protocol; and
   transmitting, by the client via the NIC, an outgoing data packet to the network using the second network protocol.

2. The method of claim 1, wherein the network property comprises at least one selected from a group consisting of packet arrival rate, burst length, network bandwidth, round trip time, and data loss rate.

3. The method of claim 1, wherein the second network protocol comprises a protocol selected from a group consisting of transmission control protocol (TCP) Tahoe, TCP Reno, TCP Vegas, TCP NewReno, TCP Hybla, TCP Westwood, TCP Selective Acknowledgement Options (SACK), Hamilton TCP (HTCP), High-Speed TCP (HSTCP), Binary Increase Congestion (BIC) TCP, Cubic BIC (CUBIC) TCP, Fast Active Queue Management Scalable TCP (FAST), Scalable TCP (STCP), Smart Acknowledgement (ACK) Dropper (SAD), and User Datagram Protocol (UDP).

4. The method of claim 1, wherein the timestamp is a time interval.

5. The method of claim 4, wherein the time interval comprises a number of nanoseconds since arrival of an earlier data packet.

6. The method of claim 4, further comprising:
   converting the timestamp to a standard time format.

7. The method of claim 1, wherein the updated first data packet is provided to the client in a data structure.

8. The method of claim 1, wherein the client is an operating system kernel.

9. The method of claim 1, wherein the client is a NIC device driver.

10. A system comprising:
    a network interface controller (NIC) comprising:
       a network interface configured to receive a first data packet from a network using a first network protocol, wherein the first data packet comprises a header;
       a NIC clock configured to generate a timestamp indicating an arrival time of the first data packet; and a NIC processor configured to:
  obtain the timestamp from the NIC clock;
  store the timestamp in the header of the first data packet to obtain an updated first data packet;
  transfer the updated first data packet directly to a memory accessible by a client;
at least one node, operatively connected to the NIC, comprising:
  the memory; and
  the client configured to receive the updated first data packet,
wherein the at least one node is configured to transmit a second data packet to the network, via the NIC, using a second network protocol selected based on a network property, wherein the second network protocol is selected from a plurality of network protocols and wherein the plurality of network protocols comprises the first network protocol and the second network protocol, and wherein the network property is computed using the timestamp.

11. The NIC of claim 10, wherein the timestamp is a time interval.

12. The NIC of claim 11, wherein the time interval comprises a number of nanoseconds since arrival of an earlier data packet.

13. The NIC of claim 10, wherein the NIC processor is configured to provide the updated first data packet to the client in a data structure.

14. The NIC of claim 10, wherein the client is an operating system kernel.

15. The NIC of claim 10, wherein the client is a NIC device driver.

* * * * *